(12) United States Patent
Ha et al.

(10) Patent No.: US 12,504,630 B2
(45) Date of Patent: Dec. 23, 2025

(54) COMPACT OPTICAL DEVICE FOR AUGMENTED REALITY USING TOTAL INTERNAL REFLECTION

(71) Applicant: LETINAR CO., LTD, Anyang-si (KR)

(72) Inventors: Jeong Hun Ha, Seoul (KR); Jae Hyeok Kim, Anyang-si (KR)

(73) Assignee: LETINAR CO., LTD, Anyang-si (KR)

( * ) Notice: Subject to any disclaimer, the term of this patent is extended or adjusted under 35 U.S.C. 154(b) by 420 days.

(21) Appl. No.: 18/016,213

(22) PCT Filed: Jun. 15, 2021

(86) PCT No.: PCT/KR2021/007480
§ 371 (c)(1),
(2) Date: Jan. 13, 2023

(87) PCT Pub. No.: WO2022/014875
PCT Pub. Date: Jan. 20, 2022

(65) Prior Publication Data
US 2023/0296897 A1    Sep. 21, 2023

(30) Foreign Application Priority Data
Jul. 17, 2020   (KR) .......................... 10-2020-0088555

(51) Int. Cl.
*G02B 27/01* (2006.01)
*G02B 17/00* (2006.01)

(52) U.S. Cl.
CPC ....... *G02B 27/0172* (2013.01); *G02B 17/006* (2013.01); *G02B 2027/012* (2013.01)

(58) Field of Classification Search
CPC .. G02B 27/0172; G02B 17/006; G02B 17/06; G02B 27/01; G02B 27/02; G02B 27/017; G02B 27/14; G02B 2027/0178
See application file for complete search history.

(56) References Cited

U.S. PATENT DOCUMENTS

| | | | |
|---|---|---|---|
| 2016/0109709 A1* | 4/2016 | Osterhout | G02B 27/0172 359/614 |
| 2017/0322417 A1* | 11/2017 | Sekiguchi | G02B 5/09 |
| 2021/0390783 A1* | 12/2021 | Shin | G02B 27/4205 |

FOREIGN PATENT DOCUMENTS

| | | | |
|---|---|---|---|
| JP | 2009-015007 A | | 1/2009 |
| JP | 2018136454 A | * | 8/2018 |
| JP | 2019-109435 A | | 7/2019 |
| KR | 10-2016-0091402 A | | 8/2016 |
| KR | 10-1660519 B1 | | 9/2016 |

(Continued)

*Primary Examiner* — Jia X Pan
(74) *Attorney, Agent, or Firm* — Rabin & Berdo, P.C.

(57) ABSTRACT

The present invention provides a compact optical device for augmented reality, the compact optical device including: an optical means configured to transmit at least part of real object image light therethrough toward the pupil of an eye of a user; a first reflective unit disposed inside the optical unit and configured to transfer augmented reality image light which is image light corresponding to an image for augmented reality output from an image output unit to a second reflective unit; and the second reflective unit disposed inside the optical means and configured to transfer the augmented reality image light transferred from the first reflective unit toward the pupil of the eye of the user by reflecting it, thereby proving an image for augmented reality to the user.

10 Claims, 10 Drawing Sheets

(56) References Cited

FOREIGN PATENT DOCUMENTS

| KR | 10-2018-0028339 A | 3/2018 |
|----|-------------------|--------|
| KR | 10-1982637 B1 | 5/2019 |
| KR | 10-2020-0045709 A | 5/2020 |

* cited by examiner

COMPACT OPTICAL DEVICE FOR AUGMENTED REALITY USING TOTAL INTERNAL REFLECTION

TECHNICAL FIELD

The present invention relates to an optical device for augmented reality, and more particularly to a compact optical device for augmented reality using total internal reflection, in which an auxiliary reflective unit serving as a collimator is disposed inside an optical means and augmented reality image light is transferred to a reflective unit by using total internal reflection on the inner surface of the optical means, thereby being capable of reducing the size, width, volume, and weight of the device and also minimizing a ghost image that may be generated.

BACKGROUND ART

Augmented Reality (AR) refers to technology that superimposes a virtual image, generated by a computer or the like, on a real image of the real world and then provides a resulting image, as is well known.

To implement augmented reality, there is required an optical system that allows a virtual image, generated by a device such as a computer, to be superimposed on an image of the real world and a resulting image to be provided. As such an optical system, there is known a technology using an optical means such as a prism for reflecting or refracting a virtual image using a head-mounted display (MMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed a configuration such as a prism capable of adjusting focal length for a virtual image and a configuration for electrically controlling a variable focal lens in response to a change in focal length. However, these technologies also have a problem in that a user needs to perform a separate operation to adjust focal length or hardware such as a separate processor and software for controlling focal length are required.

To overcome the problems of the conventional technologies, the present applicant has developed an optical device capable of implementing augmented reality by projecting a virtual image onto the retina through the pupil using a reflective unit having a size smaller than the pupil size of people, as described in patent document 1.

FIG. 1 is a diagram showing the optical device 100 for augmented reality as disclosed in patent document 1.

The optical device 100 for augmented reality, which is shown in FIG. 1, includes an optical means 10, a reflective unit 20, an image output unit 30, and a frame unit 40.

The optical means 10 is a means for transmitting at least part of real object image light, which is image light output from a real object, therethrough, and may be, e.g., a lens of eyeglasses. The reflective unit 30 is buried and disposed inside the optical means 10.

Furthermore, the optical means 10 also functions to transmit the augmented reality image light, reflected by the reflective unit 20, therethrough in order to transfer the augmented reality image light to the pupil.

The frame unit 40 is a means for fixing and supporting both the image output unit 30 and the optical means 10, and may be, e.g., an eyeglass frame.

The image output unit 30 is a means for outputting augmented reality image light, which is image light corresponding to an image for augmented reality. For example, the image output unit 30 may include a small display device configured to display an image for augmented reality on a screen and to radiate augmented reality image light, and a collimator configured to collimate the image light, radiated from the display device, into parallel light.

The reflective unit 20 reflects image light corresponding to an image for augmented reality, output from the image output unit 30, toward the pupil of a user, thereby providing an image for augmented reality.

The reflective unit 20 of FIG. 1 is formed to have a size equal to or smaller than the pupil size of people, i.e., 8 mm. By forming the reflective unit 30 to be equal to or smaller than the pupil size as described above, the depth of field for light entering the pupil through the reflective unit 20 may be made almost infinite, i.e., considerably deep.

In this case, the depth of field refers to a range within which an image for augmented reality is recognized as being in focus. When the depth of field increases, the focal distance for an image for augmented reality get increased. Accordingly, even when a user changes the focal distance for the real world while gazing at the real world, an image for augmented reality is always recognized as being in focus regardless of such a change. This may be viewed as a kind of pinhole effect. Accordingly, a user may always view a clear virtual image for an image for augmented reality even when he or she changes the focal distance while gazing at a real object in the real world.

However, this technology has a limitation in that the size, thickness, and volume of the device increase because an additional optical means such as a collimator for parallel light is required for the image output unit 30.

Patent Document 1

Korean Patent No. 10-1660519 (Sep. 29, 2016)

DISCLOSURE

Technical Problem

The present invention has been conceived to overcome the above-described problems, and an object of the present invention is to provide a compact optical device for augmented reality using total internal reflection, in which an auxiliary reflective unit serving as a collimator is disposed inside an optical means and augmented reality image light is transferred to a reflective unit by using total internal reflection on the inner surface of the optical means, thereby being capable of reducing the size, width, volume, and weight of the device.

Furthermore, another object of the present invention is to provide a compact optical device for augmented reality that is capable of minimizing a ghost image that may be generated when total internal reflection is used.

Technical Solution

In order to accomplish the above objects, the present invention provides a compact optical device for augmented reality using total internal reflection, the compact optical device including: an optical means configured to transmit at least part of real object image light therethrough toward the pupil of an eye of a user; a first reflective unit disposed inside the optical unit, and configured to transfer augmented reality image light, which is image light corresponding to an image for augmented reality output from an image output unit, to a second reflective unit; and the second reflective unit disposed inside the optical means, and configured to transfer the augmented reality image light, transferred from the first reflective unit, toward the pupil of the eye of the user by reflecting it, thereby proving an image for augmented reality to the user; wherein the optical means has a first surface which the real object image light enters, and a second surface through which the augmented reality image light transferred through the second reflective unit and the real object image are output toward the pupil of the eye of the user; wherein the reflective surface of the first reflective unit reflecting the augmented reality image light is disposed to face the first surface of the optical means; wherein the augmented reality image light output from the image output unit is reflected by total internal reflection on the first surface of the optical means and transferred to the first reflective unit, is reflected by the first reflective unit and output toward the first surface of the optical unit, and is reflected by total internal reflection on the first surface of the optical means and transferred to the second reflective unit; and wherein the second reflective unit is disposed inside the optical means to transfer the augmented reality image light, reflected by total internal reflection on the first surface and then transferred, toward the pupil of the eye of the user by reflecting it.

In this case, the reflective surface of the first reflective unit may be formed to be concave with respect to the first surface of the first optical means.

Furthermore, the length of the first reflective unit in the widthwise direction is preferably 4 mm or less.

Furthermore, the second reflective unit may be formed as a plurality of second reflective units, and each of the second reflective units may be arranged to have an inclination angle with respect to the second surface of the optical means to transfer augmented reality image light, output from the first reflective unit, reflected by total internal reflection on the first surface of the optical means and then transferred, toward the pupil by reflecting it.

Furthermore, each of the second reflective units is preferably formed to have a size of 4 mm or less.

Furthermore, each of the second reflective units may be arranged such that augmented reality image light output from the first reflective unit, reflected by total internal reflection on the first surface of the optical means, and then transferred is not blocked by other second reflective units.

Furthermore, the compact optical device preferably further includes a ghost image light absorption unit disposed between the image output unit and the first reflective unit and configured to absorb ghost image light, generating a ghost image, out of the augmented reality image light output from the image output unit.

Furthermore, the ghost image light absorption unit is preferably disposed between the image output unit and the first reflective unit inside the optical means to absorb at least part of augmented reality image light that is output from the image output unit, is transferred directly to the first reflective unit and generates a ghost image.

Furthermore, the ghost image light absorption unit may be disposed on an imaginary straight line that directly connects a point of the image output unit from which the augmented reality image light generating a ghost image is output with any one point of the reflective surface of the first reflective unit.

Furthermore, the ghost image light absorption unit may be made of a light-absorbing material that does not reflect light.

Furthermore, the surface of the ghost image light absorption unit opposite to the image output unit may be formed of a coated surface that is made of a light-absorbing material.

Advantageous Effects

According to the present invention, there may be provided the compact optical device for augmented reality using total internal reflection, in which the auxiliary reflective unit serving as a collimator is disposed inside the optical means and augmented reality image light is transferred to the reflective unit by using total internal reflection on the inner surface of the optical means, thereby being capable of reducing the size, width, volume, and weight of the device.

Furthermore, there may be provided the compact optical device for augmented reality that is capable of minimizing a ghost image that may be generated when total internal reflection is used.

BEST MODE

Embodiments according to the present invention will be described in detail below with reference to the accompanying drawings.

Figure 1:
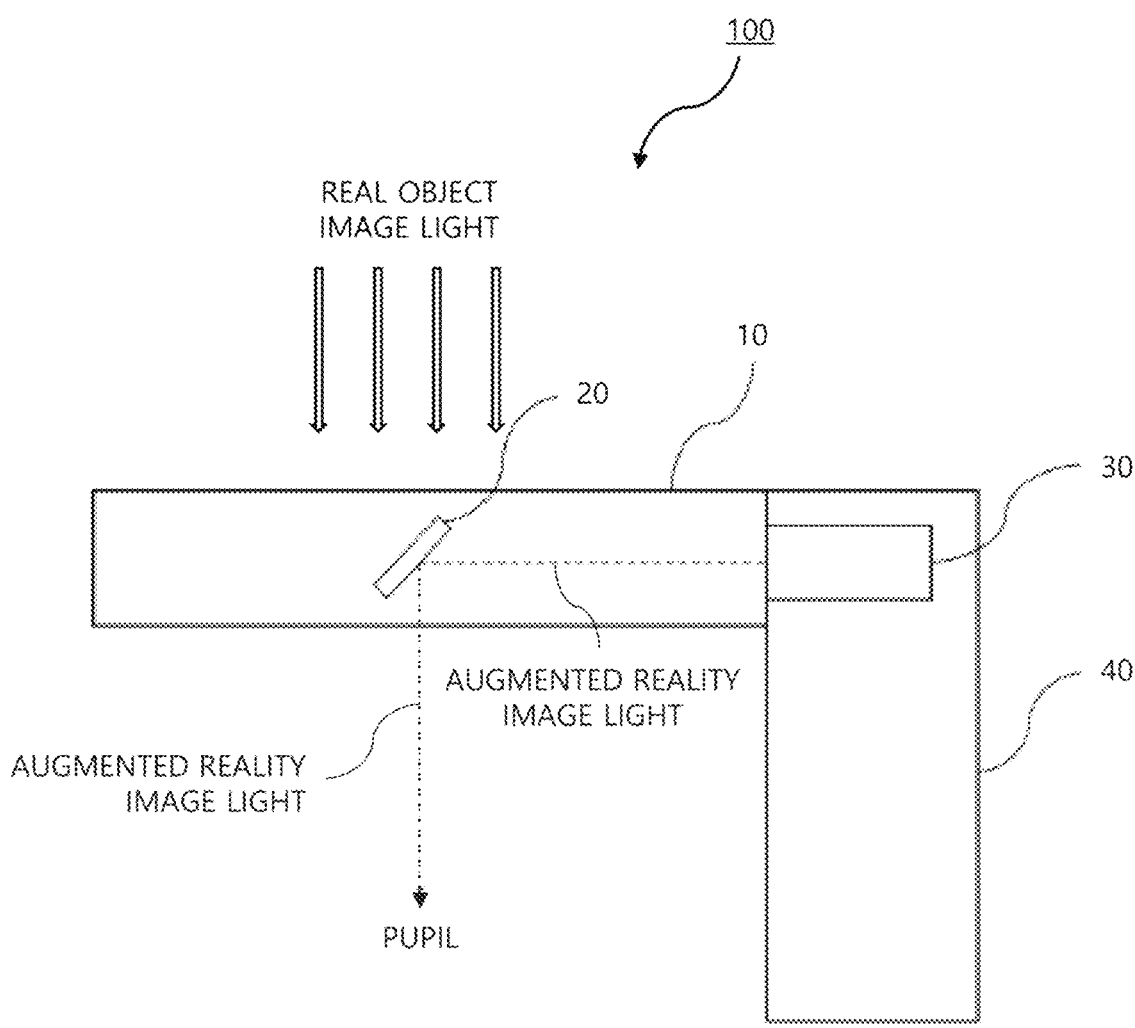
FIG. 1 is a diagram showing an optical device (100) for augmented reality as disclosed in patent document 1.
Figure 2:
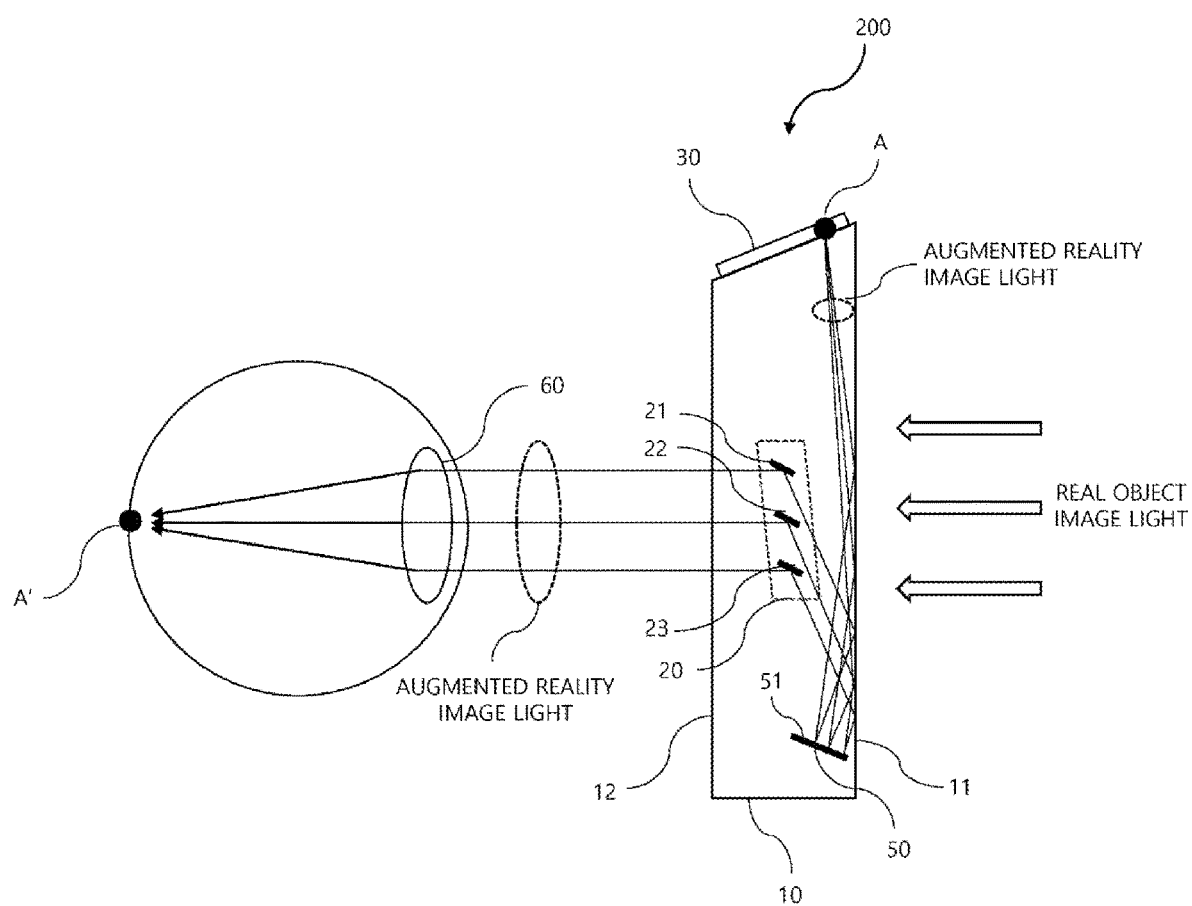
FIG. 2 is a side view of a compact optical device (200) for augmented reality using total internal reflection according to an embodiment of the present invention.

FIG. 2 is a side view of a compact optical device 200 for augmented reality using total internal reflection according to an embodiment of the present invention.

The compact optical device 200 for augmented reality using total internal reflection (hereinafter simply referred to as the "optical device 200 for augmented reality") according to the embodiment of FIG. 2 includes an optical means 10, a first reflective unit 50, and a second reflective unit 20.

The optical means 10 is a means for transmitting at least part of real object image light, which is image light output from a real object, therethrough toward the pupil 60 of an eye of a user.

In this case, the fact that at least part of real object image light is transmitted toward the pupil 60 implies that the light transmittance of the real object image light does not necessarily need to be 100%.

The optical means 10 has first and second surfaces 11 and 12 that are opposite to each other. The first surface 11 is a surface which real object image light enters, and the second surface 12 is a surface through which the augmented reality image light reflected by the second reflective unit 20 and corresponding to an image for augmented reality and the real object image light transmitted through the first surface 11 are output toward the pupil 60 of the eye of the user.

Although the first surface 11 and second surface 12 of the optical means 10 are formed to be parallel to each other in the embodiment of FIG. 2, this is exemplary. It is obvious that the first surface 11 and the second surface 12 may be disposed not to be parallel to each other.

In the embodiment of FIG. 2, the augmented reality image light output from the image output unit 30 is reflected by total internal reflection on the first surface 11 of the optical means 10 and transferred to the first reflective unit 50, and the augmented reality image light reflected by the first reflective unit 50 is output toward the first surface 11, reflected by total internal reflection on the first surface 11 again and transferred to the second reflective unit 20. The second reflective unit 20 is configured to reflect the incident augmented reality image light so that the reflected augmented reality image light is output to the pupil 60 through the second surface 12 of the optical means 10.

In this case, the second reflective unit 20 is formed of a plurality of reflective units 21, 22, and 23. In the present specification, the plurality of reflective units 21, 22, and 23 are collectively referred to as the second reflective unit 20. The detailed configuration of the second reflective unit 20 will be described later.

Meanwhile, the image output unit 30 is a means for outputting augmented reality image light, which is image light corresponding to an image for augmented reality, and may be, for example, a display device such as a small-sized liquid crystal display (LCD).

Since the image output unit 30 itself is not a direct target of the present invention and is known in prior art, a detailed description thereof will be omitted here. However, the image output unit 30 according to the present embodiment does not include a component such as a collimator described in the description of the related art.

Meanwhile, the "image for augmented reality" refers to a virtual image that is transferred to the pupil 60 of a user through the image output unit 30, the optical means 10, the first reflective unit 50, and the second reflective unit 20. It may be, for example, a still image or moving image.

The image for augmented reality is transferred to the pupil 60 of the user through the image output unit 30, the optical means 10, the first reflective unit 50, and the second reflective unit 20, and is thus transferred to the user as a virtual image. At the same time, the user receives the real object image light, output from a real object present in the real world, through the optical means 10. Accordingly, the user may be provided with an augmented reality service.

Next, the first reflective unit 50 will be described.

The first reflective unit 50 is buried and disposed inside the optical means 10 and is configured to transfer augmented reality image light, output from the image output unit 30 and corresponding to an augmented reality image, to the second reflective unit 20.

In the embodiment of FIG. 2, as described above, the image output unit 30 outputs augmented reality image light toward the first surface 11 of the optical means 10, and the augmented reality image light is reflected by total internal reflection on the first surface 11 of the optical means 10 and transferred to the first reflective unit 50.

Thereafter, the augmented reality image light is reflected by the first reflective unit 50 and output toward the first surface 11 of the optical means 10. Then, the augmented reality image light is reflected by total internal reflection on the first surface of the optical means 10, and then transferred to the second reflective unit 20. Then, the second reflective unit 20 outputs the incident augmented reality image light toward the pupil 60 by reflecting it.

As shown in FIG. 2, the first reflective unit 50 is buried and disposed inside the optical means 10 to face the image output unit 30 with the second reflective 20 interposed therebetween.

In addition, the first reflective unit 50 is buried and disposed at an appropriate position in the inner space between the first surface 11 and second surface 12 of the optical means 10 in order to reflect off image light for augmented reality toward the first surface 11 of the optical means 10.

In other words, the first reflective unit 50 is disposed at an appropriate position inside the optical means 10 between the first surface 11 and second surface 12 of the optical means 10 by taking into consideration the relative positions of the image output unit 30, the second reflective unit 20, and the pupil 60 in order to reflect back the incident augmented reality image light, output from the image output unit 30 and reflected by total internal reflection on the first surface 11 of the optical means 10, toward the first surface 11 of the optical means 10.

In the embodiment of FIG. 2, the first reflective unit 50 is buried and disposed inside the optical means 10 so that the reflective surface 51 of the first reflective unit 50 that reflects augmented reality image light faces the surface that real object image light enters, i.e., the first surface 11 of the optical means 10.

Preferably, the reflective surface 51 of the first reflective unit 50 may be formed as a concave mirror that is formed to be concave with respect to the first surface 11 of the optical means 10. According to this, the first reflective unit 50 may serve as a collimator for collimating augmented reality image light output from the image output unit 30. Accordingly, there is no need to use a component such as a collimator for the image output unit 30, so that the overall size and volume of the device can be reduced.

Meanwhile, as will be described later, the size of the second reflective unit 20 is formed to be equal to or smaller than 8 mm, which is the common pupil size of people, more preferably 4 mm. By taking into consideration this, the length of the first reflective unit 20 in the widthwise direction thereof is formed to be 8 mm or less, more preferably 4 mm or less, to correspond to the size of the second reflective unit 30.

In this case, the widthwise direction of the first reflective unit 50 refers to the direction extending between the first surface 11 and second surface 12 of the optical means 10 in FIG. 2.

In addition, it is preferable that the first reflective unit 50 has a considerably thin thickness when viewed from the front through the pupil 60 by a user in order to make the user rarely recognize the first reflective unit 50 through the pupil 60 as much as possible.

Furthermore, the first reflective unit 50 may be formed of a means such as a half mirror that partially reflects light.

Furthermore, the first reflective unit 50 may be formed of a refractive or diffractive element other than a reflective means.

Furthermore, the first reflective unit 50 may be formed of an optical element such as a notch filter that selectively transmits light according to the wavelength of the light.

Furthermore, the surface of the first reflective unit 50 opposite to the reflective surface 51 reflecting augmented reality image light may be coated with a material that does not reflect light but absorbs it.

Next, the second reflective unit 20 will be described.

The second reflective unit 20 is buried and disposed inside the optical means 10 and is configured to transfer the augmented reality image light, transferred through the first reflective unit 50 and the first surface 11 of the optical means 10, toward the pupil 60 of the eye of the user by reflecting it, thereby providing an image for augmented reality to a user.

At least one second reflective unit 20 may be formed. In FIG. 2, the second reflective unit 20 is formed of the three second reflective units 21, 22, and 23.

The plurality of second reflective units 21, 22, and 23 are buried and disposed inside the optical means 10 in order to transfer augmented reality image light, which is output from the first reflective unit 50 and transferred from the first surface 11 of the optical means 10 by total internal reflection on the first surface 11, to the pupil 60 of the user by reflecting it.

As described above, the augmented reality image light output from the image output unit 30 is reflected by total internal reflection on the first surface 11 of the optical means 10 and transferred to the first reflective unit 50. And then the augmented reality image light reflected by the first reflective unit 50 is output toward the first surface 11 of the optical means 10, reflected by total internal reflection on the first surface 11 again, and transferred to the second reflective unit 20. Accordingly, the plurality of reflective units 21, 22, and 23 constituting the second reflective unit 20 are arranged to have an appropriate inclination angle with respect to the second surface 12 of the optical means 10 by taking into consideration the positions of the first reflective unit 50 and the pupil 60 and the position the first surface 11 of the optical means 10.

Each of the plurality of reflective units 21, 22, and 23 has a size equal to or smaller than the pupil size of people, i.e., 8 mm or less, more preferably 4 mm or less, in order to achieve a pinhole effect by increasing the depth of field, as described in the background art section.

In other words, each of the plurality of reflective units 21, 22, and 23 is formed to have a size equal to or smaller than the common pupil size of people. Accordingly, the depth of field for the light incident onto the pupil 60 through each of the reflective units 21, 22, and 23 may be made almost infinite, i.e., considerably deep. Accordingly, there may be achieved a pinhole effect that allows an image for augmented reality to be always recognized as being in focus regardless of a change in the focal distance even when a user changes the focal distance for the real world while gazing at the real world.

In this case, the size of each of the plurality of reflective units 21, 22, and 23 is defined as the maximum length between any two points on the edge boundary of each of the reflective units 21, 22, and 23.

Furthermore, the size of each of the plurality of reflective units 21, 22, and 23 may be the maximum length between any two points on the edge boundary of an orthographic projection obtained by projecting each of the plurality of reflective units 21, 22, and 23 onto a plane that is perpendicular to a straight line between the pupil 50 and the reflective units 21, 22, and 23 and includes the center of the pupil 50.

Furthermore, when the size of the plurality of reflective units 21, 22, and 23 is excessively small, an image for augmented reality may not be clear due to a diffraction effect, and thus it is necessary to form the plurality of reflective units 21, 22, and 23 to have an appropriate size or more. For example, the size of the plurality of reflective unit 21, 22, and 23 may be larger than about 50 µm to about 700 µm.

Meanwhile, each of the plurality of reflective units 21, 22, and 23 is appropriately arranged such that the augmented reality image light transferred through the first reflective unit 50 and the first surface 11 of the optical means 10 is not blocked by other reflective units 21, 22, and 23.

For example, as shown in FIG. 2, the plurality of reflective units 21, 22, and 23 may be arranged such that the reflective units 21, 22, are 23 are located closer to the second surface 12 of the optical means 10 in the direction from bottom to top.

According to this configuration, as shown in FIG. 2, the augmented reality image light output from any one point A of the image output unit 30 is reflected by total internal reflection on the first surface 11 of the optical means 10 and transferred to the first reflective unit 50. The augmented reality image light reflected by the first reflective unit 50 serving as a collimator is output toward the first surface 11 of the optical means 10 as parallel light.

Furthermore, the augmented reality image light reflected by total internal reflection on the first surface 11 of the optical means 10 is transferred to the second reflective unit 20 including the plurality of second reflective units 21, 22, and 23. The beams of augmented reality image light, which are parallel light, reflected by the second reflective units 21, 22, and 23, respectively, are transferred to a point A' of the retina of the user through the pupil 60 and form an image.

Meanwhile, the sizes of the plurality of reflective units 21, 22, and 23 do not have to be all the same, and may be partially different from each other.

Furthermore, although the plurality of reflective units 21, 22, and 23 are preferably arranged at the same intervals, the interval between at least some of the reflective units 21, 22, and 23 may be different from the interval between the other reflective units 21, 22, and 23.

Furthermore, at least some of the plurality of reflective units 21, 22, and 23 may each be formed of a means such as a half mirror that partially reflects light.

Furthermore, at least some of the plurality of second reflective units 21, 22, and 23 may each be formed of a refractive or diffractive element other than a reflective unit.

Furthermore, at least some of the plurality of second reflective units 21, 22, and 23 may each be formed of an optical element such as a notch filter that selectively transmits light therethrough according to the wavelength of the light.

Furthermore, the surfaces of at least some of the plurality of second reflective units 21, 22, and 23 opposite to the surfaces thereof reflecting augmented reality image light may be coated with a material that does not reflect light but absorbs it.

Furthermore, the surfaces of at least some of the plurality of reflective units 21, 22, and 23 may be formed as curved surfaces. In this case, the curved surfaces may be concave surfaces or convex surfaces.

Furthermore, the inclination angle of at least some of the plurality of reflective units 21, 22, and 23 with respect to the optical means 10 may be formed to be different from the inclination angle of the other reflective units 21, 22, and/or 23.

Figure 3:
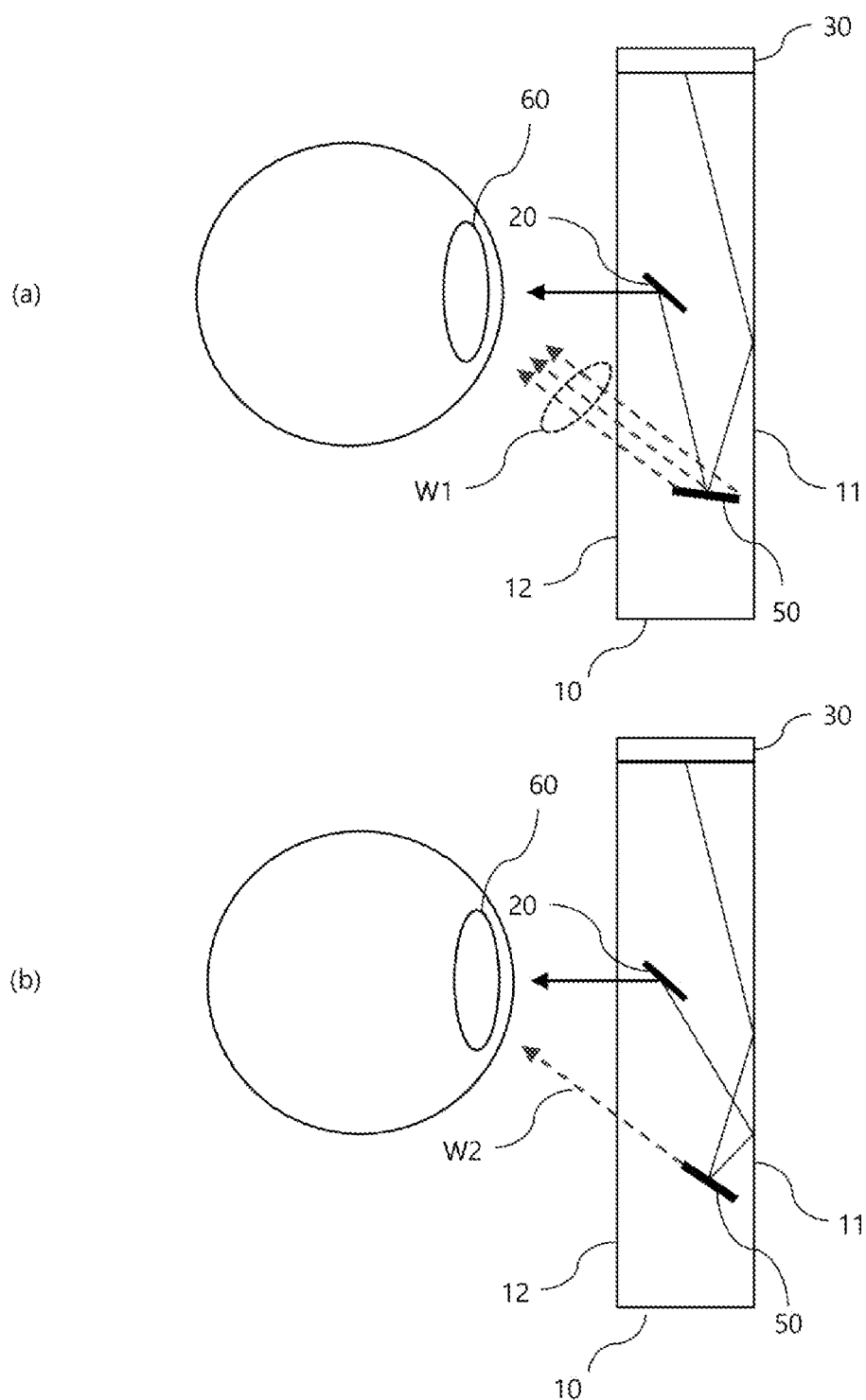
FIGS. 3 and 4 are diagrams illustrating the effects of the optical device (200) for augmented reality according to the embodiment of FIG. 2.
Figure 4:
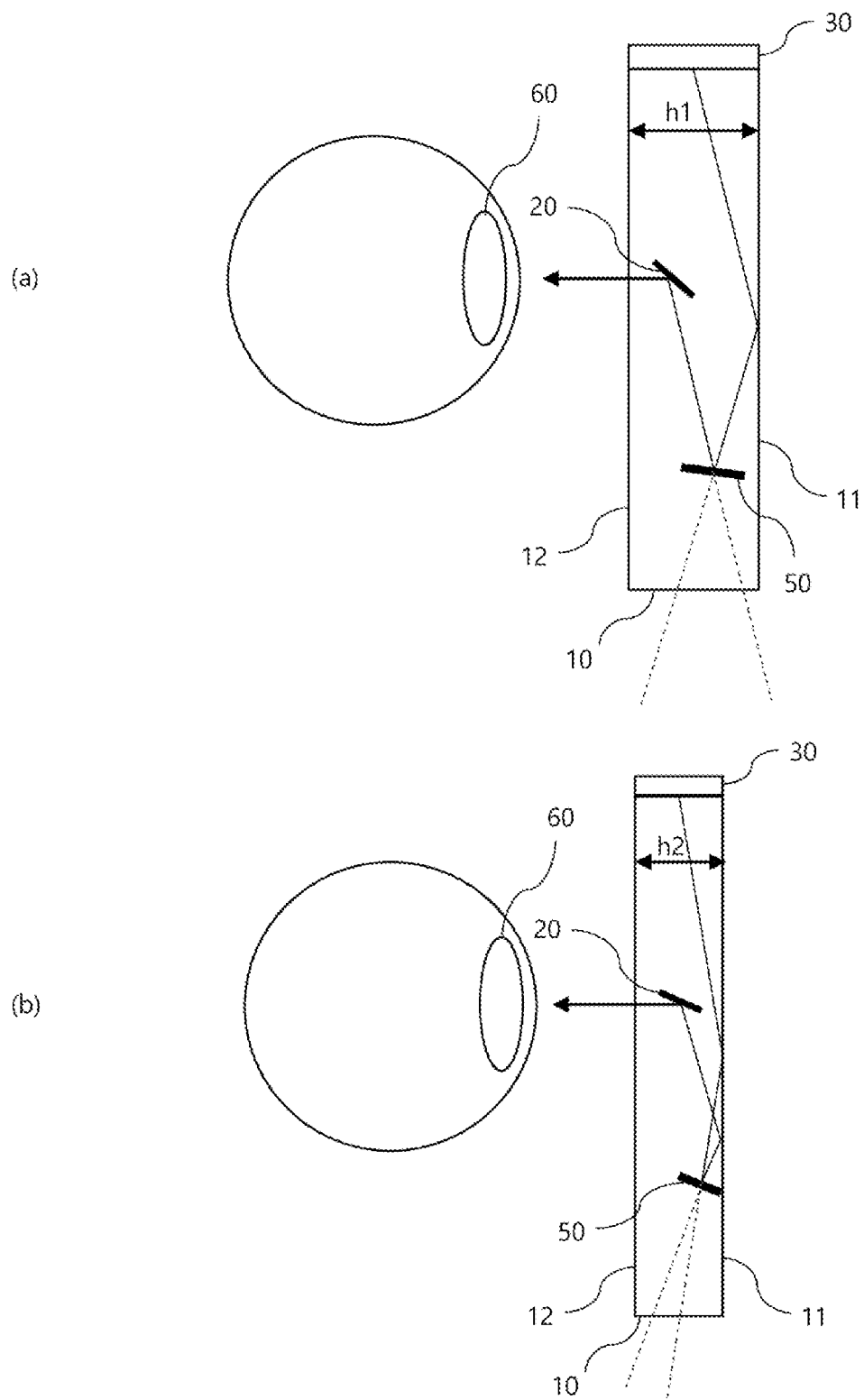

FIGS. 3 and 4 are diagrams illustrating the effects of the optical device 200 for augmented reality according to the embodiment of FIG. 2. FIGS. 3 and 4 illustrate a case in which only one second reflective unit 20 is disposed for ease of description.

FIGS. 3(a) and 4(a) show a case in which the augmented reality image light reflected by the first reflective unit 50 is transferred directly to the second reflective unit 20. FIGS. 3(b) and 4(b) shows the configuration described with reference to FIG. 2, i.e., a case in which the augmented reality image light reflected by the first reflective unit 50 is reflected by total internal reflection on the first surface 11 of the optical means 10 and transferred to the second reflective unit 20.

First, referring to FIG. 3, it can be seen that the size W1 of the first reflective unit 50 shown to a user in FIG. 3(a) is significantly larger than the size W2 of the first reflective unit 50 shown to a user in FIG. 3(b). Accordingly, it can be seen that in the case of FIG. 3(b), the first reflective unit 50 is rarely recognized by the user, so that a see-through function can be significantly increased compared to that of the case of FIG. 3(a).

Meanwhile, referring to FIG. 4, it can be seen that the angles of incidence and reflection of augmented reality image light with respect to the first reflective unit 50 in FIG. 4(b) are smaller than the angles of incidence and reflection of augmented reality image light with respect to the first reflective unit 50 in FIG. 4(a), so that optical performance can be increased.

Furthermore, it can be seen that the width h2 of the optical means 10 in FIG. 4(b) may also be made smaller than the width h1 of the optical means 10 in FIG. 4(a), so that the thickness of the optical means 10 can be reduced. Accordingly, it can be seen that the case of FIG. 4(b) is advantageous in reducing the size and volume of the overall device and improving the overall optical performance compared to the case of FIG. 4(a).

Figure 5:
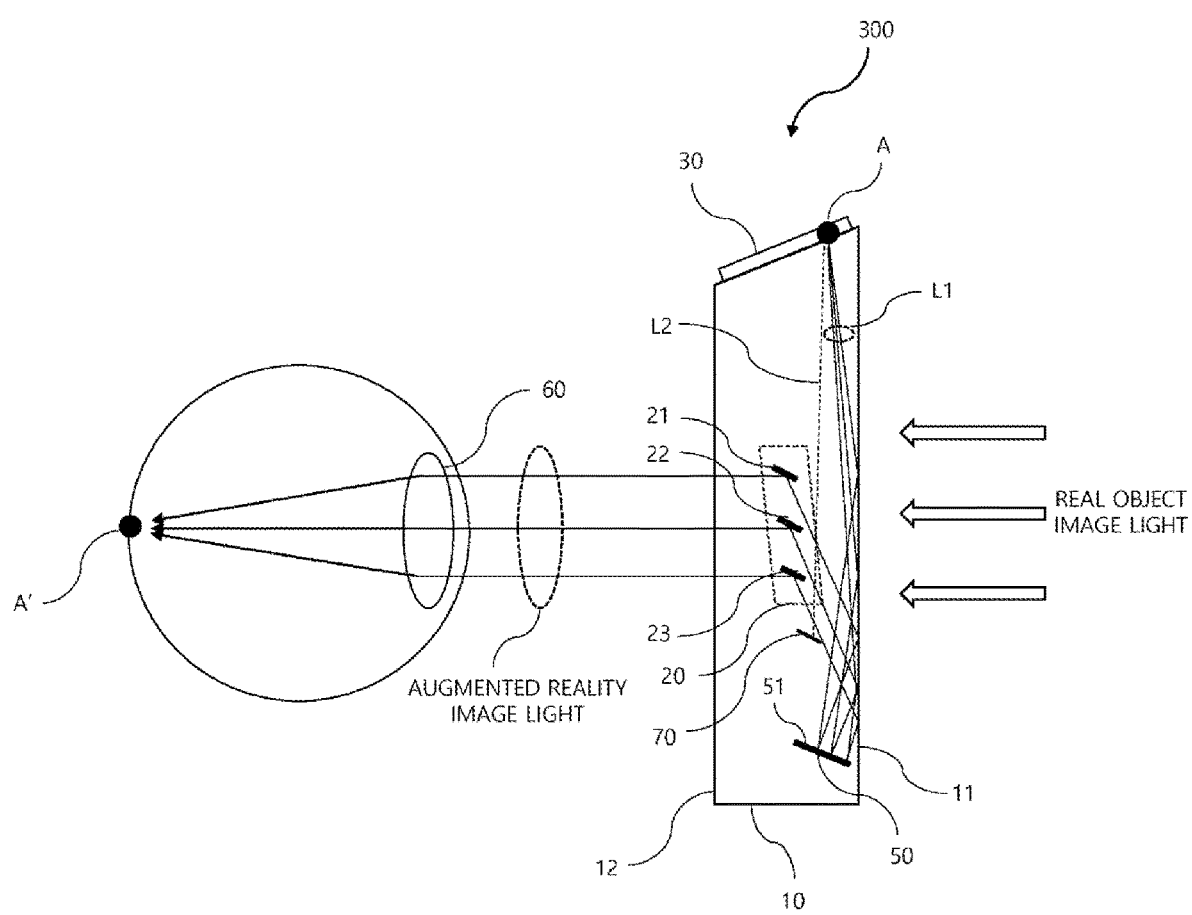
FIG. 5 is a side view of an optical device (300) for augmented reality according to another embodiment of the present invention.

FIG. 5 is a side view of an optical device 300 for augmented reality according to another embodiment of the present invention.

The optical device 300 for augmented reality according to the embodiment of FIG. 5 is the same as the optical device 200 for augmented reality described above with reference to FIGS. 2 to 4 except that it is different in that it further includes a ghost image light absorption unit 70.

In the embodiment of FIG. 5, the other components are the same as those of the optical device 200 for augmented reality described above with reference to FIGS. 2 to 4, so that detailed description thereof will be omitted and only the ghost image light absorption unit 70 will be described.

The ghost image light absorption unit 70 is disposed between the image output unit 30 and the first reflective unit 50, and serves to absorb ghost image light generating a ghost image out of the augmented reality image light output from the image output unit 30.

Figure 6:
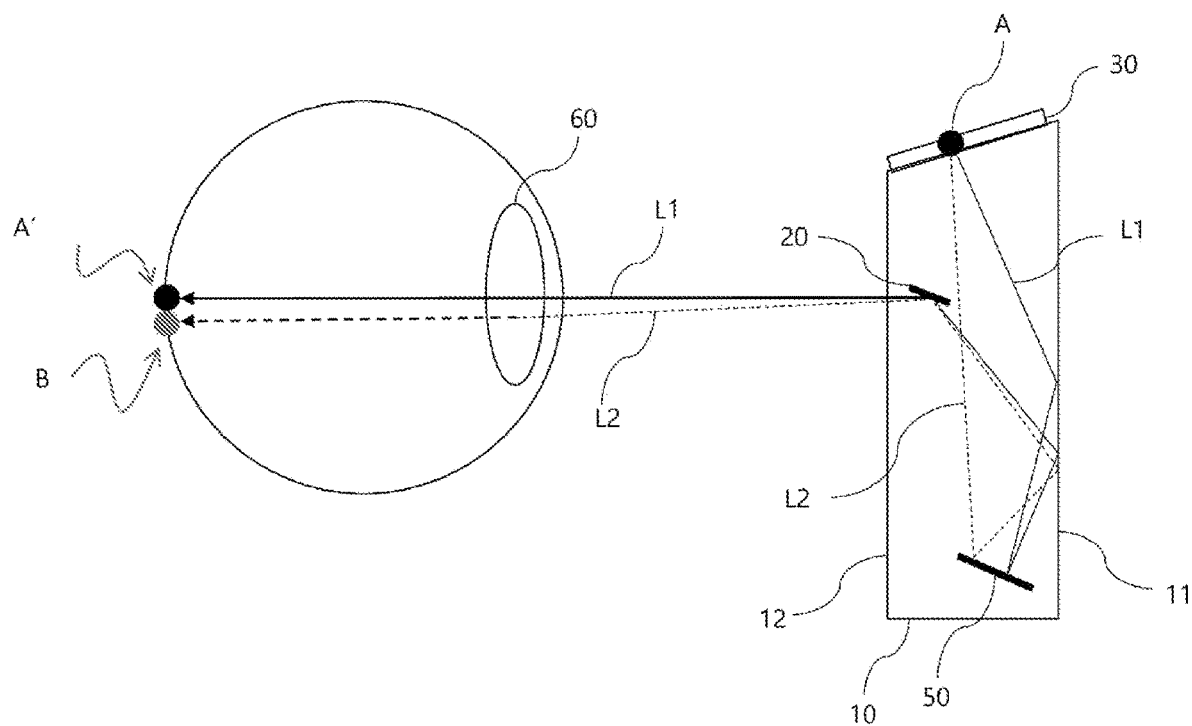
FIGS. 6 and 7 are diagrams illustrating the function of the ghost image light absorption unit (70)
Figure 7:
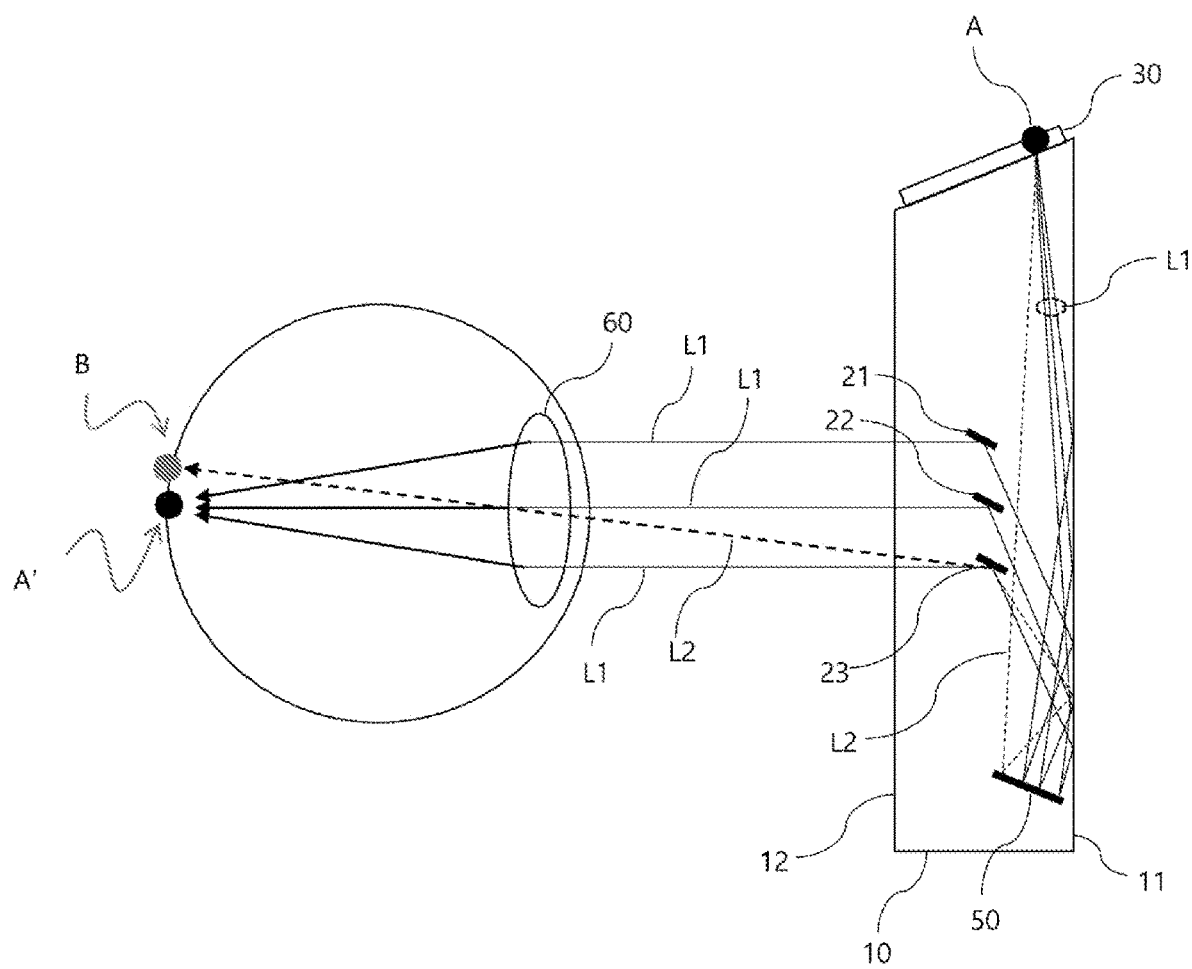

FIGS. 6 and 7 are diagrams illustrating the function of the ghost image light absorption unit 70.

First, FIG. 6 shows a case in which a ghost image is generated in the optical device 200 for augmented reality according to the embodiment described above with reference to FIGS. 2 to 4. In this case, only one second reflective unit 20 is shown for ease of description.

Referring to FIG. 6, among beams (rays) of augmented reality image light L1 and L2 output from arbitrary point A of the image output unit 30, the beam of augmented reality image light L1 is reflected by total internal reflection on the first surface 11 of the optical means 10 and then enters the first reflective unit 50, as described above with reference to FIGS. 2 to 4.

Furthermore, the augmented reality image light L1 reflected by the first reflective unit 50 is output to the first surface 11 of the optical means 10 again, reflected by total internal reflection thereon, and then transferred to the second reflective unit 20. The augmented reality image light L1 reflected by the second reflective unit 20 is transferred to the retina through the pupil 60 and forms a normal image A'.

Meanwhile, among the beams of augmented reality image light L1 and L2 output from arbitrary point A of the image output unit 30, the beam of augmented reality image light L2 indicated by the dotted lines is transferred directly to the first reflective unit 50, is reflected therefrom and output to the first surface 11 of the optical means 10, is reflected by total internal reflection thereon and transferred to the second reflective unit 20, is reflected by the second reflective unit 20 again and transferred to the retina through the pupil 60, and forms an image B. This image B is formed at a different position from that of the image A' on the retina, which acts as a reason for forming a ghost image.

Meanwhile, FIG. 7 shows a case in which a ghost image is generated in an optical device 200 for augmented reality having a plurality of second reflective units 21, 22, and 23. Even in this case, among the beams of augmented reality image lights L1 and L2 output from an arbitrary point A of the image output unit 30, the beam of augmented reality image light L1 is transferred to a point on the retina via the optical path described above with reference to FIGS. 2 to 4 and forms an image A', whereas the beam of augmented reality image light L2 indicated by the dotted lines forms an image B at a location different from the location where the image A is formed on the retina, which causes a ghost image to be generated.

That is to say, a ghost image is generated by the beam of augmented reality image light, which is directly transferred to the first reflective unit 50 and forms an image on the retina through the pupil via at least one of the first reflective unit, the optical means and the second reflective unit, among the beams of augmented reality image light output from an arbitrary point of the image emitter 30.

In other words, the ghost image refers to an image that forms an image at a position different from the position where normal augmented reality image light, which has passed through an optical path intended when the optical device 200 for augmented reality is designed, forms an image on the retina.

The ghost image light absorption unit 70 absorbs such augmented reality image light, generating a ghost image, without reflecting it so that it is not transferred to the second reflective unit 20, thereby minimizing a ghost image.

The ghost image light absorption unit 70 is disposed inside the optical means 10 based on the above-described principle, so that the beam of augmented reality image light L2, which is output from the image output unit 30, is transferred directly to the first reflective unit 50 and may form a ghost image, can be absorbed by the ghost image light absorption unit 70, thereby preventing the beam of augmented reality image light L2 from being transferred to the second reflective unit 20 and the pupil 60, as shown in FIG. 5.

Figure 8:
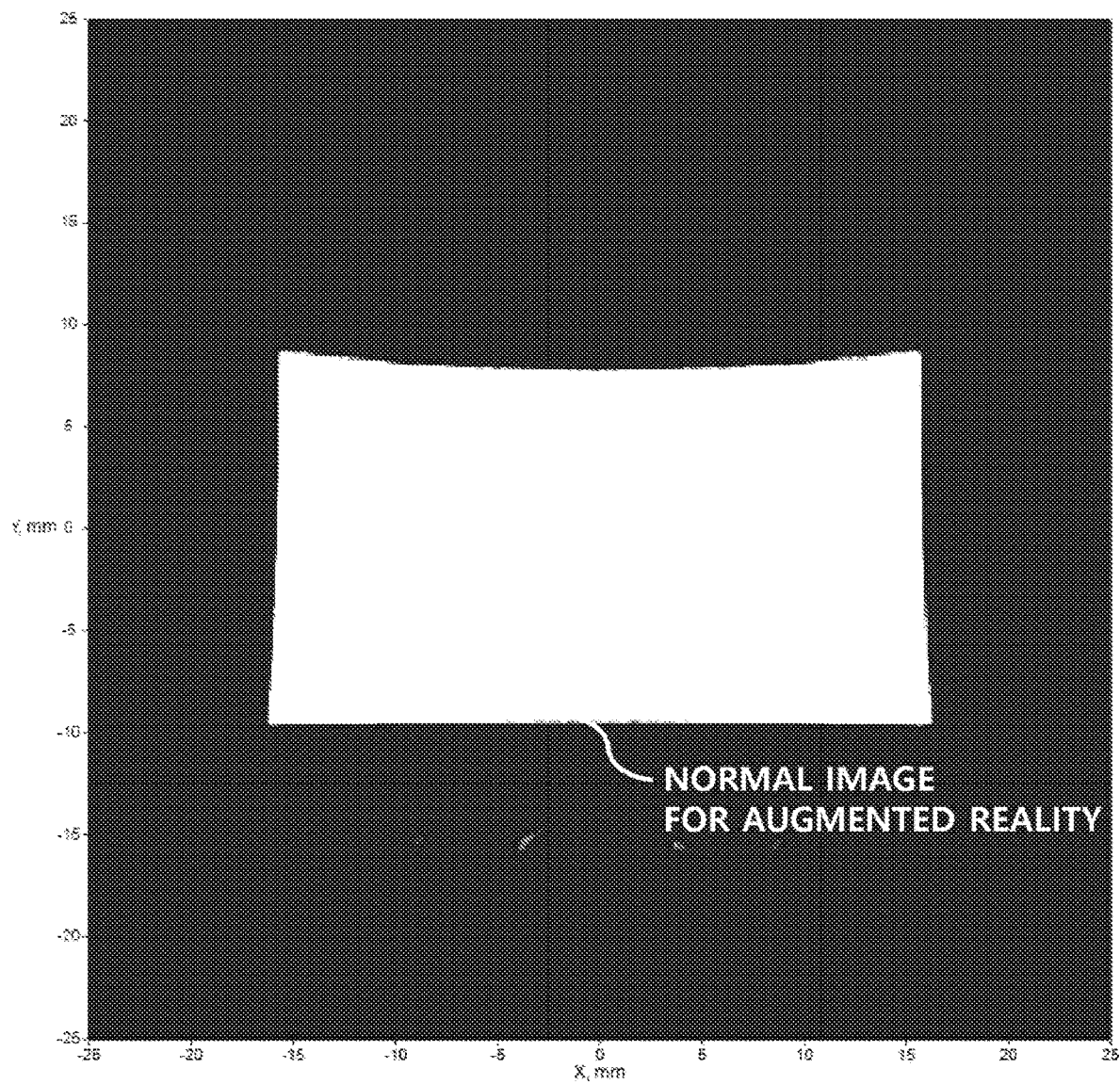
FIGS. 8 to 10 show a normal image for augmented reality and/or a ghost image actually shown to a user.
Figure 9:
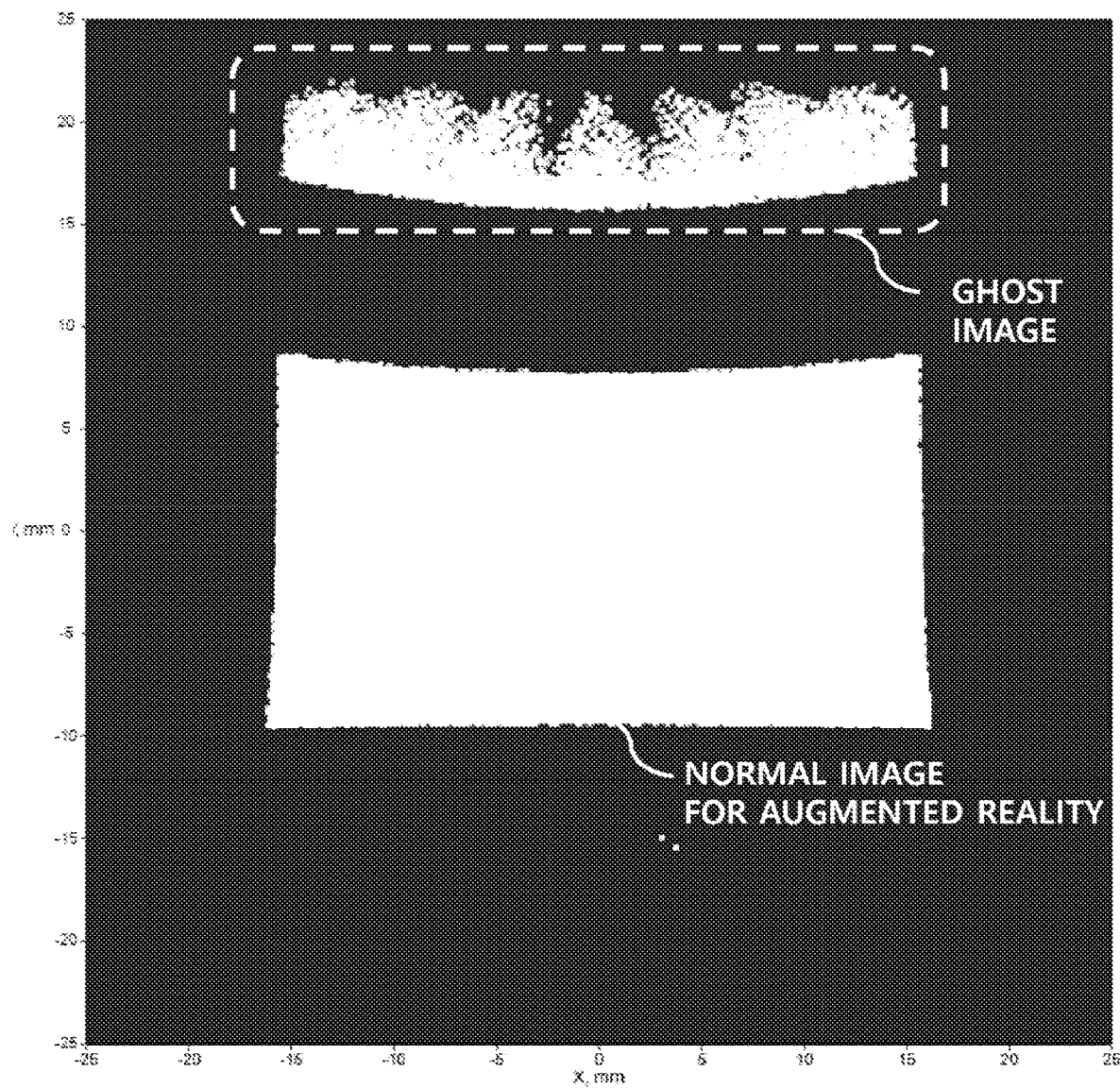
Figure 10:
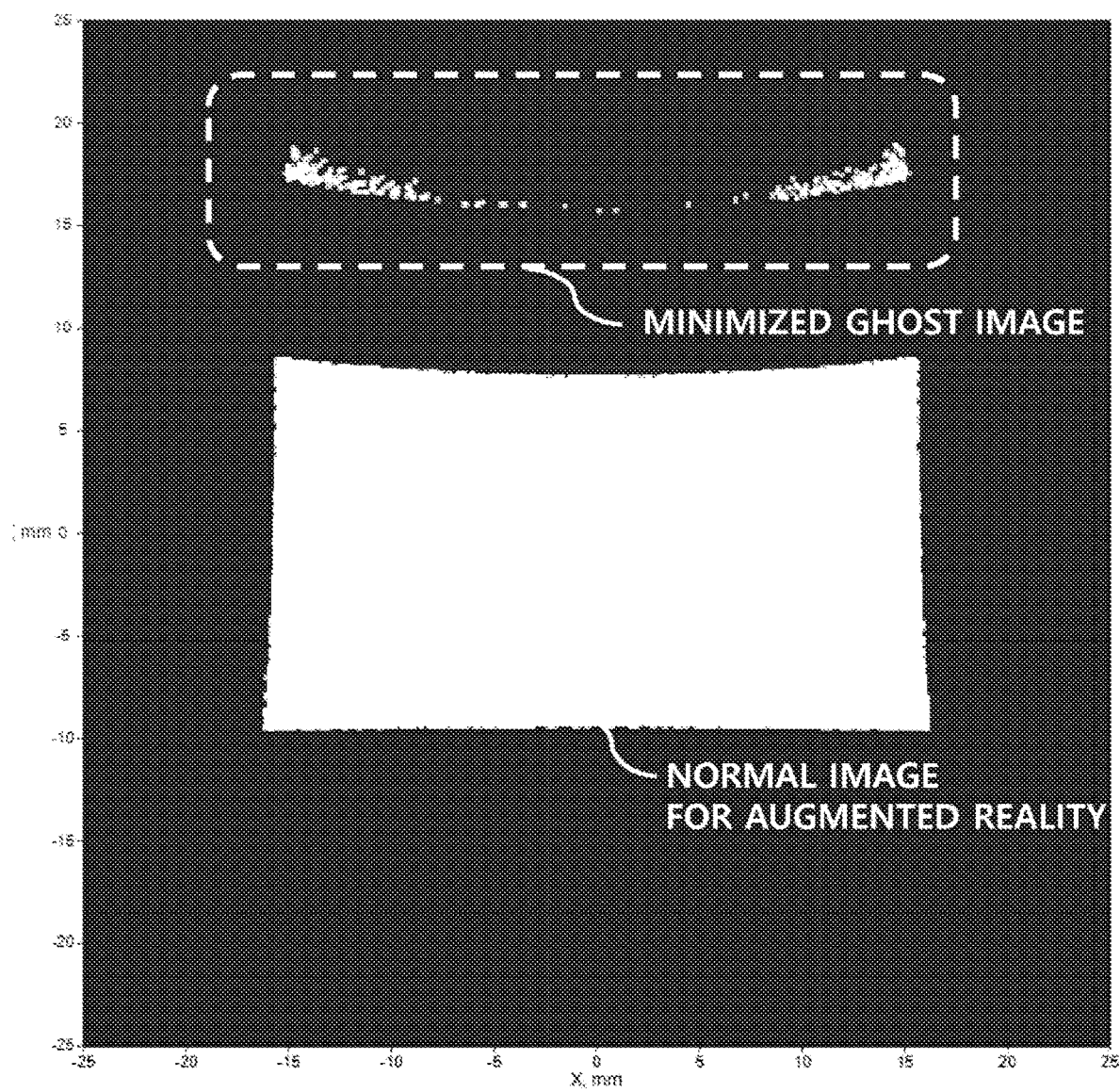

FIGS. 8 to 10 show a normal image for augmented reality and/or a ghost image actually shown to a user.

FIG. 8 shows a state in which a normal image for augmented reality without a ghost image is shown, and FIG. 9 shows a state in which a ghost image is shown in the upper portion. FIG. 10 shows a state in which a ghost image is minimized by the ghost image light absorption unit 70 as described with reference to FIGS. 5 to 7 and is then shown to a user.

To provide this function, the ghost image light absorption unit 70 is preferably disposed between the image output unit 30 and the first reflective unit 50 inside the optical means 10 in order to absorb at least part of the augmented reality image light that is output from the image output unit 30, is transferred directly to the first reflective unit 50 and generates a ghost image.

Furthermore, the ghost image light absorption unit 70 is preferably disposed on an imaginary straight line that directly connects a point of the image output unit 30 from which augmented reality image light generating a ghost image is output with any one point of the reflective surface 51 of the first reflective unit 50.

Furthermore, the ghost image light absorption unit 70 is preferably disposed below the second reflective unit 20 with respect to the image output unit 30.

The ghost image light absorption unit 70 is preferably made of a light-absorbing material that does not reflect light. For example, the surface of the ghost image light absorption unit 70 opposite to the image output unit 30 may be formed of a coated surface that is made of a light-absorbing material.

In this case, the light-absorbing material refers to a material having the property of not reflecting light. Being made of a light-absorbing material signifies that the surface of the ghost image light absorbing part 70 is coated with paint or the like made of a material having the property of absorbing light without reflecting it, or signifies that the ghost image light absorption unit 70 itself is made of a light-absorbing material. Since the light-absorbing material and the paint made of the light-absorbing material are known in the prior art and are not direct targets of the present invention, detailed descriptions thereof will be omitted.

While the configuration of the present invention has been described above with reference to the preferred embodiments of the present invention, it is obvious that the present invention is not limited to the above-described embodiments and various modifications and alterations may be made within the scope of the present invention.

The invention claimed is:

1. A compact optical device for augmented reality using total internal reflection, the compact optical device comprising:
   an optical means configured to transmit at least part of real object image light therethrough toward a pupil of an eye of a user;
   a first reflective unit disposed inside the optical means, and configured to transfer augmented reality image light, which is image light corresponding to an image for augmented reality output from an image output unit, to a second reflective unit; and
   the second reflective unit, the second reflective unit being disposed inside the optical means, and configured to transfer the augmented reality image light, transferred from the first reflective unit, toward the pupil of the eye of the user by reflecting the augmented reality image light, thereby providing an image for augmented reality to the user;
   wherein the optical means has a first surface which the real object image light enters, and a second surface through which the augmented reality image light transferred through the second reflective unit and the real object image are output toward the pupil of the eye of the user;
   wherein the first reflective unit is buried and disposed inside the optical means to face the image output unit with the second reflective unit interposed therebetween;
   wherein a reflective surface of the first reflective unit reflecting the augmented reality image light is disposed to face the first surface of the optical means and is formed to be concave with respect to the first surface of the optical means;
   wherein the augmented reality image light output from the image output unit is reflected by total internal reflection on the first surface of the optical means and transferred to the first reflective unit, is reflected by the first reflective unit and output toward the first surface of the optical means, and is reflected by total internal reflection on the first surface of the optical means and transferred to the second reflective unit; and
   wherein the second reflective unit is disposed inside the optical means to transfer the augmented reality image light, reflected by total internal reflection on the first surface and then transferred, toward the pupil of the eye of the user by reflecting the augmented reality image light.

2. The compact optical device of claim 1, wherein a length of the first reflective unit in a widthwise direction of the first reflective unit is 4 mm or less, the widthwise direction extending between the first surface and second surface of the optical means.

3. The compact optical device of claim 1, wherein the second reflective unit is formed as a plurality of second reflective units, and each of the second reflective units is arranged to have an inclination angle with respect to the second surface of the optical means to transfer augmented reality image light, output from the first reflective unit, reflected by total internal reflection on the first surface of the optical means and then transferred, toward the pupil by reflecting the augmented reality image light.

4. The compact optical device of claim 3, wherein each of the second reflective units is formed to have a size of 4 mm or less.

5. The compact optical device of claim 3, wherein each of the second reflective units is arranged such that augmented reality image light output from the first reflective unit, reflected by total internal reflection on the first surface of the optical means, and then transferred is not blocked by other second reflective units.

6. The compact optical device of claim 1, further comprising a ghost image light absorption unit disposed between the image output unit and the first reflective unit and configured to absorb ghost image light, generating a ghost image, out of the augmented reality image light output from the image output unit.

7. The compact optical device of claim 6, wherein the ghost image light absorption unit is disposed between the image output unit and the first reflective unit inside the optical means to absorb at least part of augmented reality image light that is output from the image output unit, is transferred directly to the first reflective unit and generates a ghost image.

8. The compact optical device of claim 6, wherein the ghost image light absorption unit is disposed on an imaginary straight line that directly connects a point of the image output unit from which the augmented reality image light generating a ghost image is output with any one point of the reflective surface of the first reflective unit.

9. The compact optical device of claim 6, wherein the ghost image light absorption unit is made of a light-absorbing material that does not reflect light.

10. The compact optical device of claim 9, wherein a surface of the ghost image light absorption unit opposite to the image output unit is formed of a coated surface that is made of a light-absorbing material.

\* \* \* \* \*